United States Patent [19]

Noguchi et al.

[11] Patent Number: 5,270,628
[45] Date of Patent: Dec. 14, 1993

[54] METHOD AND APPARATUS FOR AUTOMATIC ROBOTIC CONTROL OF A VEHICLE

[75] Inventors: Shinji Noguchi, Kyoto; Shigeyuki Kawarabayashi, Kameoka, both of Japan

[73] Assignee: Horiba, Ltd., Japan

[21] Appl. No.: 814,717

[22] Filed: Dec. 30, 1991

[30] Foreign Application Priority Data

Dec. 30, 1990 [JP] Japan .................. 2-416954

[51] Int. Cl.⁵ .................. H02P 3/14; B60K 31/00
[52] U.S. Cl. .................. 318/587; 318/568.1; 364/426.04; 364/426.03; 123/436; 434/267; 74/866
[58] Field of Search .................. 318/560–646, 318/139; 395/80–89; 364/424.01–424.04, 426.06, 426.03; 180/8.1–8.8, 316; 901/50, 45, 1, 3, 5, 9, 12, 15–23, 46, 44; 73/132, 116, 117, 865.9; 13/866.4, 862.04, 12, 172; 434/270, 274, 267

[56] References Cited

U.S. PATENT DOCUMENTS

| | | | |
|---|---|---|---|
| 3,147,617 | 9/1964 | Kaptur, Jr. et al. | 434/267 X |
| 4,284,936 | 8/1981 | Bailey et al. | 318/375 X |
| 4,327,578 | 5/1982 | D'Angelo . | |
| 4,385,518 | 5/1983 | Rickett | 73/866.4 X |
| 4,482,813 | 11/1984 | Grand-Perrot et al. | 318/139 X |
| 4,524,286 | 6/1985 | Kremer | 318/139 X |
| 4,641,251 | 2/1987 | Inoue | 364/191 X |
| 4,914,597 | 4/1990 | Moncelle et al. | 364/426.04 |
| 4,946,015 | 8/1990 | Browalshi et al. | 364/426.03 X |
| 4,953,093 | 8/1990 | Etoh | 364/426.04 |
| 4,969,103 | 11/1990 | Maekawa | 364/426.04 |
| 4,971,011 | 11/1990 | Nanyoshi et al. | 123/436 |
| 4,976,170 | 12/1990 | Hayashi et al. | 74/866 |
| 4,998,782 | 3/1991 | Thatcher et al. | 364/426.03 X |
| 5,002,148 | 3/1991 | Miyake et al. | 364/426.03 X |
| 5,009,294 | 4/1991 | Ghoneim | 364/426.03 X |
| 5,012,689 | 5/1991 | Smith | 318/266 X |
| 5,018,977 | 5/1991 | Wiley et al. | 434/274 |
| 5,019,986 | 5/1991 | Londt et al. | 364/426.04 |
| 5,025,882 | 6/1991 | Ghoneim et al. | 364/426.01 |
| 5,084,821 | 1/1992 | Ohsuga et al. | 364/426.01 |
| 5,163,530 | 11/1992 | Nakamura et al. | 180/197 |
| 5,172,589 | 12/1992 | Witt | 901/50 |

FOREIGN PATENT DOCUMENTS

| | | |
|---|---|---|
| 3027475 | 7/1980 | Fed. Rep. of Germany . |
| 3535924 | 10/1985 | Fed. Rep. of Germany . |
| 3721605 | 6/1987 | Fed. Rep. of Germany . |
| 3930911 | 9/1989 | Fed. Rep. of Germany . |

*Primary Examiner*—Paul Ip
*Attorney, Agent, or Firm*—Price, Gess & Ubell

[57] ABSTRACT

The present invention provides a system for controlling the automatic driving of a vehicle for monitoring its performance and includes robotic controls for operating the driver controls. The relationship between accelerator and throttle-open positions at various speeds is stored and for a particular desired nominal velocity, an estimated open position for the throttle can be determined. The actual velocity of the vehicle, for example, on a dynamometer, is monitored and fed back to create further adjustment of a throttle-open position. Additionally, acceleration and brake pedal force can also be stored and an estimated brake pedal force can be derived and varied, depending upon any calculated difference between the actual velocity monitored and the desired monitored velocity. As a result of these features, a more precise robotic control of the vehicle can be established for closely responding to a predetermined driving pattern.

12 Claims, 4 Drawing Sheets

METHOD AND APPARATUS FOR AUTOMATIC ROBOTIC CONTROL OF A VEHICLE

BACKGROUND OF THE INVENTION

1. Field of the Invention

The present invention relates to a system and method of controlling the automatic, robotic driving of an vehicle to simulate controlled operator performance of the vehicle and, more particularly, for controlling the operation of a vehicle in correlation with a dynamometer so that the response of the vehicle can be accurately maintained to match the desired profiles of operation being monitored.

2. Description of Related Art

It has become a common practice in both the vehicle industry and government regulatory agencies to use dynamometers and other electro-mechanical devices to simulate road load and vehicle inertia forces for testing vehicles in place. The vehicle dynamometers can act as measuring devices for determining the torque and/or horsepower output of a vehicle and further as a simulation device for simulating the inertia and road load forces to which a vehicle is normally subjected during the actual operation of the vehicle. As can be readily appreciated, not only can the torque and horsepower output of the vehicle be determined, frequently there is a correlation with the analysis of the engine emissions to determine potential pollution associated with the performance of the vehicle relative to government guidelines. Because of the tight controls that are being imposed by government regulatory agencies, it is extremely important that any simulated vehicle driven operation on a chassis dynamometer be carried out as accurately as possible to improve the precision of the desired measurements. The vehicle can be subjected to a predetermined dynamic road ability test and the response of the vehicle should attempt to accurately match the requirements of such testing procedures.

To remove the subjective characteristics of having a human operator respond to the various performance criteria demanded, efforts have been made to utilize an automatic driving robot which can be installed in the vehicle under test to operate the various operator controls on a precise basis to enable an objective testing procedure to be achieved.

The automatic driving robot can be physically installed in the vehicle and a plurality of actuators can be individually driven by various force exerting means, such as oil pressure, air pressure, a DC motor or the like, to carry out the operation of controlling the accelerator pedal, a brake pedal, a clutch pedal and a switching operation of the shift lever, where required.

In operation, a predetermined vehicle drive simulation procedure is utilized and it is necessary to drive the vehicle in accordance with this predetermined driving pattern. For example, in order to control a throttle servo system and/or alternatively the brake servo system, a difference between a nominal velocity VNOM and the actual velocity of the vehicle VACT on the chassis dynamometer must be controlled.

Reference can be made to FIG. 3 for a schematic example of such a conventional system wherein the roller surface velocity signal of the chassis dynamometer 1 is linked into a PI (proportional and integral) control system 2 to feed back control associated with the opening of a throttle servo system 3. Within the PI control system 2, a multiplier circuit 4 and an integrator circuit 5 can be utilized. These functions can also frequently be performed with a microprocessor system. In the schematic, reference number 6 designates an engine that is responsive to the throttle servo system 3, reference number 7 designates a power train as the power transmission system, and reference points 8 and 9 are designated as butt points (a.k.a. summing points), wherein the sum of two signals can be added or subtracted.

A problem which has occurred in the conventional system is that a significant delay occurs in both the operated and controlled quantity of the throttle and/or brake at a so-called change over speed point in the predetermined driving pattern. Thus, when an acceleration is suddenly changed, such as from an accelerated drive to a stationary driving mode of operation or from a stationary driving operation to a reduced speed drive operation and then, for example, from a reduced speed driving operation to again an accelerated driving operation, a significant disadvantage occurs in that an overshooting relative to the desired predetermined driving pattern frequently occurs and erroneous information can be introduced into the performance of the vehicle.

Thus, there is still a need in the art to provide an improved system for controlling an automatic driving of an vehicle for monitoring its performance in an economical manner in order to create an objective and repetitive testing system.

SUMMARY OF THE INVENTION

The present invention provides a system for controlling an automatic driving of an vehicle for monitoring its performance and includes robotic controls for automatically and physically operating the driver controls to remove the subjective performance of the human operator. A relationship between, for example, acceleration and throttle-open position at various speeds of the particular vehicle being monitored is stored. The predetermined desired speed or estimated open position for the throttle for accelerating in a nominal velocity is determined and the estimated throttle open position is then supplied to the robot controls for actuating the throttle. The actual velocity is then monitored as the dynamometer is driven. A comparison circuit then calculates the difference between the actual velocity and the nominal velocity and then implements an adjustment of the controls of the robot based on any calculated difference between the actual velocity and the nominal velocity. As can be appreciated, a microprocessor with look-up tables can be utilized for memorizing the relationship between the acceleration and throttle-open positions. Additionally, the throttle-open position can be considered a generic term, regardless if the throttle position is implemented by carburetors, fuel control systems, etc.

In accordance with practicing the present invention, the operator, or a program for setting the predetermined driving pattern, inputs the nominal velocity and the acceleration at the nominal velocity is then determined and subsequently utilized to look up from appropriate memorized tables, the estimated throttle-open position which is then applied to the robotic controls for actually driving the vehicle. The actual velocity is monitored and any difference between the actual velocity and the desired nominal velocity is fed back to adjust the controls of the robotic system.

As can be further appreciated, the relationship between acceleration and any brake pedal force at respective predetermined speed positions of the vehicle is also previously determined and appropriately stored, for example, through a look-up table in a microprocessor system. An estimated brake pedal force for a brake servo system required at a predetermined change over speed position can be calculated, depending upon acceleration at the nominal velocity. The results of this calculation can then be fed forward as, in fact, the operating nominal value of the brake servo system. The actual velocity is then fed back to proportional and integral control. Any difference between this actual velocity and the nominal velocity is then calculated and used as a control output to be added to or subtracted from the operating nominal velocity that controls the brake servo system.

Thus, in similar manner to that when acceleration is being changed, wherein the opening of the throttle was estimated by a feed forward system, the braking force can also be estimated and applied in a feed forward system. As a result, the necessity of amending the PI control system being relied upon to ensure a close adherence to the predetermined driving pattern is reduced and a quick adherence to that driving pattern can be achieved by the feed forward system of the present invention.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THEE EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a method and apparatus of robotic control of a vehicle.

Figure 1:
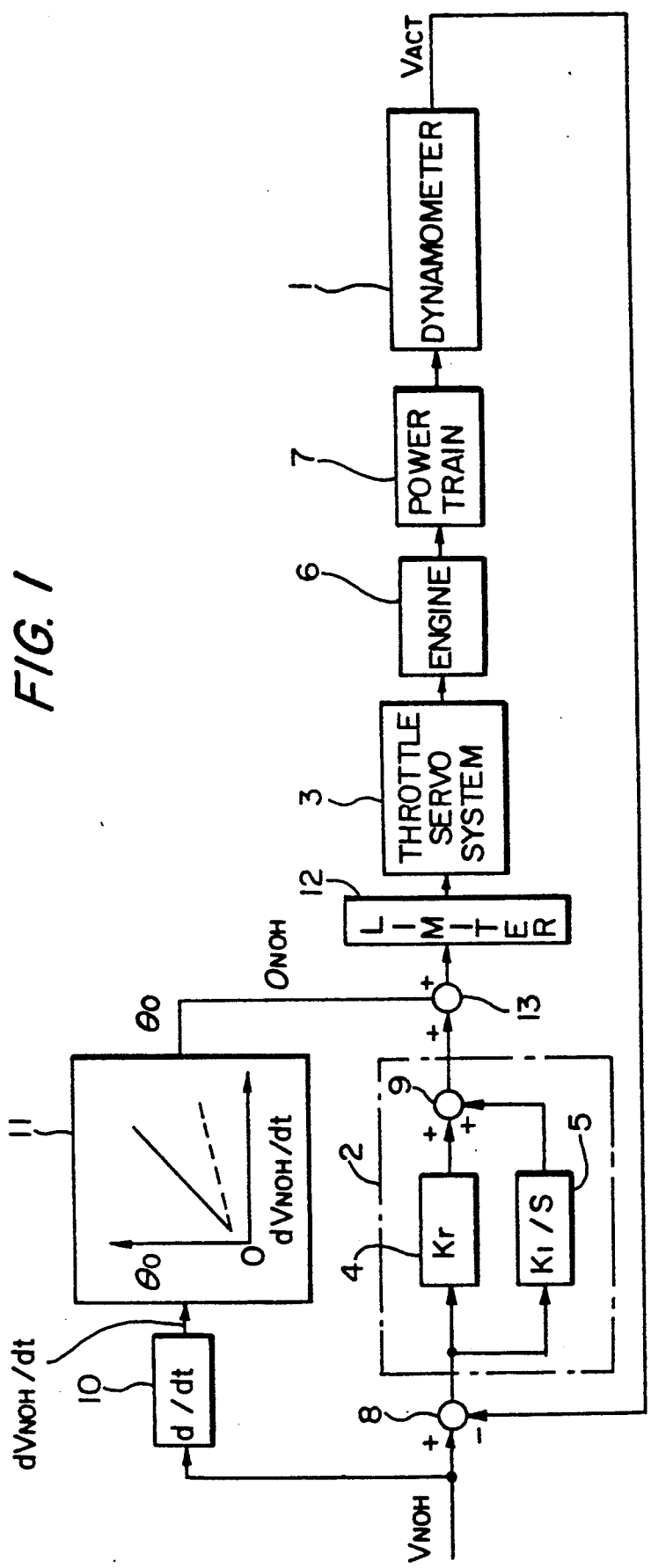
FIG. 1 is a block diagram showing a schematic of a throttle controlling system.
Figure 3:
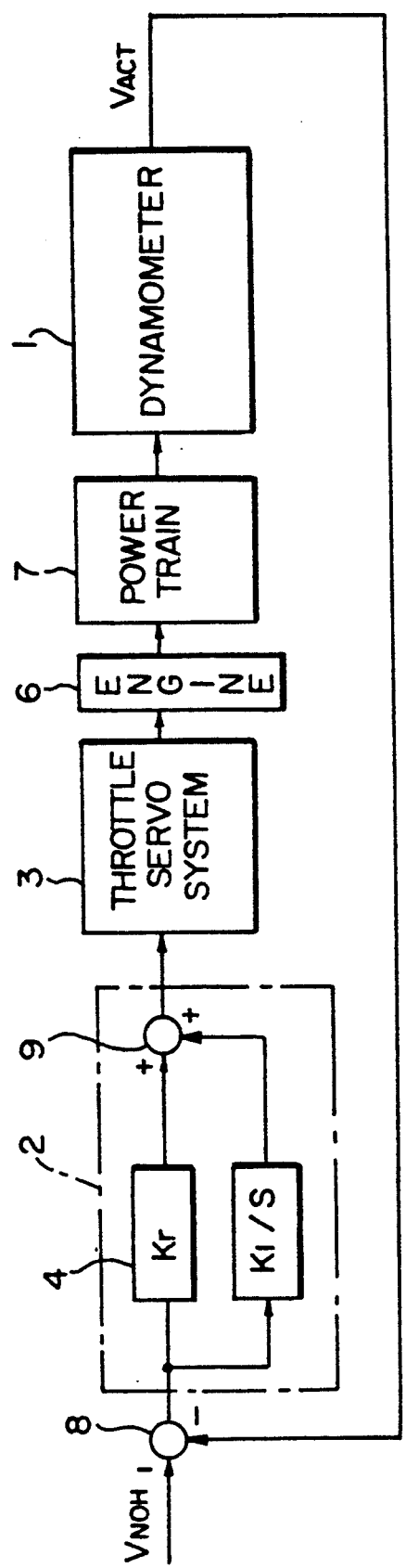
FIG. 3 is a block diagram showing a conventional system.

Referring to FIG. 1, those reference numbers that are the same with regard to FIG. 3, will be utilized for the same elements in FIG. 1. FIG. 1 is a schematic block diagram showing a first preferred embodiment of a throttle controlling system to enable an automatic driving of an vehicle in accordance with the purpose of the present invention.

Supplementing the disclosure of the present invention, applicant incorporates hereby, by reference, the subject matter of U.S. Pat. No. 4,327,578 and U.S. Pat. No. 4,450,728.

Reference number 10 discloses a differentiator circuit, while reference number 11 discloses an estimated throttle opening value generator, which can be implemented in a microprocessor based system with the values stored in look-up tables. Reference number 12 designates a limiter and reference number 13 designates a butt point for combining control signals.

The estimated throttle opening value generator 11 calculates an estimated throttle opening value $\Theta_o$ for the throttle servo system 3 at a predetermined acceleration. This estimated throttle opening value $\Theta_o$ is derived from predetermined values of a relationship between an acceleration throttle opening characteristic. The estimated throttle opening value $\Theta_o$ can be used for setting a throttle opening corresponding to a nominal value $\Theta_{NOM}$. The acceleration-throttle opening characteristics can be obtained subjectively by various methods. For example, the throttle openings at three different points of a constant speed drive ($dV/dT=0$), a constant acceleration drive ($dV/dT-0.8$ m/sec$^2$ and an acceleration full-closed reduce-speed drive ($dV/dT=-\Delta V/\Delta T$) can be collected through operation of a robotic control system during a setting of predetermined parameters and these values can then be memorized and set in a look-up table. Additionally, the accelerationthrottle opening characteristics can be collected at the respective shift positions, such as, for example, in first and second shift gear positions, in a manual transmission mode (M/T). The speed section can be further divided into three subsections, for example, 0 to 40 km/h, 40 to 80 km/h, and 80km/h or more to prepare a data base at various accelerations, such as, for example, 3 or 4 different acceleration states within the speed sections (e.g., 0 M/S$^2$, 0.8 M/S$^2$, 1.6m/s$^2$, 3.2 m/s$^2$, in an automatic transmission method (A/T).

The limiter circuit 12 can, for example, comprise a lower limiter value and an upper limiter value for limiting a range of the throttle opening nominal value $\Theta_{NOM}$. The lower limiter value being operated when an accelerator begins to act while the upper limiter value will be activated during a time period when the accelerator is at a full open throttle position (lower limiter defines fully closed position of throttle). When the upper limiter is operating, an integration by the integrator circuit 5 is prohibited, while as soon as the lower limiter is operated, a speed control by the brake control, which will be described later, can be activated (upper limiter defines a fully open condition of throttle). In a system wherein the speed control is carried out in accordance with the above described construction parameters, a predetermined nominal velocity $V_{NOM}$ can be introduced into the system by means of, for example, a drive pattern generator, not shown. The nominal value $V_{NOM}$ is put into the differentiator circuit 10 and acceleration $dV_{NOM}/dT$ is then determined from this differentiator. This acceleration $dV_{NOM}/dT$ can then be utilized to determine the estimated throttle opening value from the generator 11, for example, by utilization of a stored look-up table in a microprocessor based system to thereby calculate the estimated throttle opening value $\Theta_o$ on the basis of the acceleration-throttle opening characteristics stored in the estimated throttle opening value generator circuit ii. This estimated throttle opening value $\Theta_n$ is then inserted into the control system at a butt point 13 as an operating nominal value for the throttle servo system 3.

An actual velocity $V_{ACT}$ of the vehicle on the chassis dynamometer is fed back to the PI control system at butt point 8. The PI control system 2 with the multiplier circuit 4 and the integrator circuit 5 can provide modified outputs to butt point 9. Since the $V_{ACT}$ is applied as a negative value to $V_{NOM}$, if $V_{ACT}$ equals $v_{NOM}$, no additional modification of $\Theta_o$ is required at butt point 13. The control output is then added to the operating nominal value to result in an additional step to determine the throttle opening nominal value $\Theta_{NOM}$ to the limiter 12. This throttle opening value ENOM is then sent to the throttle servo system 3 to adjust the parameters of operation. In accordance with the above described control system, a throttle opening is estimated in a feed forward system, when acceleration is changed so that a significant requirement of adjusting an opening in the PI control system 2 is reduced and an efficient follow-up response is achieved.

Figure 2:
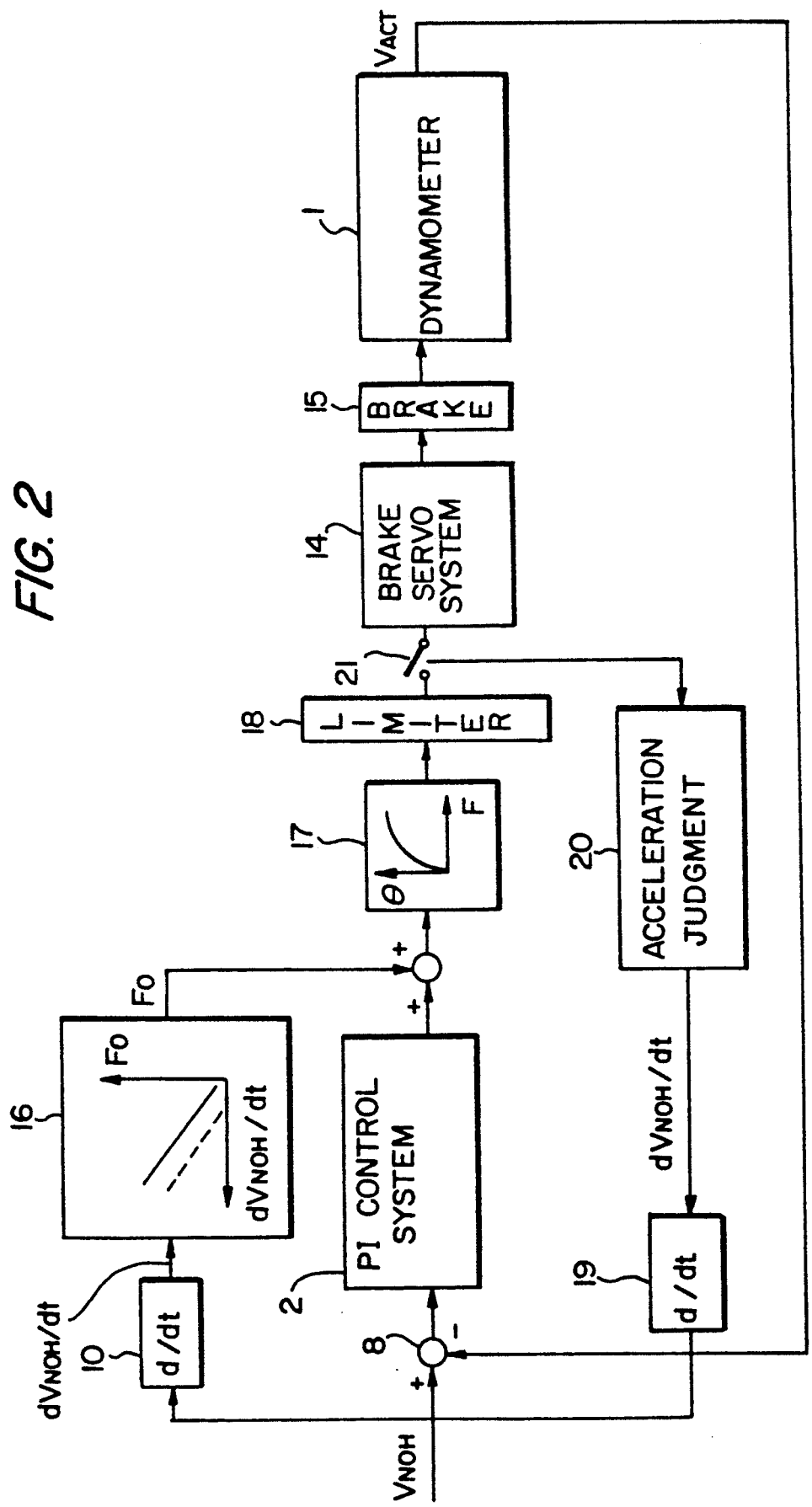
FIG. 2 is a block diagram showing a schematic of a brake controlling system.

FIG. 2 is a schematic block diagram showing an example of a brake control system utilized in an automatic driving of a vehicle according to another feature of the present invention. As can be appreciated, the brake control system can complement the acceleration throttle open system in defining the responsive parameters of the automatic driving of the vehicle.

Referring to FIG. 2, reference number 14 designates the brake servo system, while reference number 15 designates the brake, and reference number 1 designates the dynamometer. Reference number 16 refers to an estimated brake pedaling force value generator circuit, which could be realized through stored look-up tables provided in a-microprocessor based system. Reference number 17 designates a brake pedal force stoke converter. Reference number 18 designates a limiter circuit while reference number 19 designates a differentiator circuit. The output of the differentiator circuit 10 could, of course, be used in lieu of the differentiator circuit 19. Reference number 20 designates an acceleration judging device 20, while reference number 21 designates a changeover switch, with reference number 22 designating a butt point.

The estimated brake pedal force value generator circuit 16 is capable of calculating an estimated brake pedaling force value $F_o$ for the brake servo system 14 and this can be accomplished from predetermined relationships that have been empirically determined between acceleration and the brake pedal force characteristics. These predetermined characteristics can be set forth in a look-up table that has been previously and empirically defined. For example, brake pedal forces at three operative points of an accelerator full closed reduced speed drive, a brake pedal force at a neutral constant reduced speed drive, and the start of braking can be empirically determined through the operation of the robotic controls in accordance with set parameters and the resulting data can then be recorded and memorized for future use.

A brake pedal force stoke converter 17 determines what degree of stroke is required in order to obtain a predetermined brake pedal force and can constitute a brake pedal force stroke converting generator which stores data collected again through an empirical observation when the vehicle is being subject to predetermined driving conditions. This conversion is necessary because, while deceleration is proportionate to the brake pedal force, the brake pedal force is not proportional to the brake stroke.

The limiter circuit 18 comprises a lower limiter and an upper limiter for limiting the range at which the brake stroke nominal value $\Theta_{NOM}$ can be operated. The lower limiter is operated when the brake begins to act while the upper limiter is operated during the time period when the brake is in a full stroke position. The limiter 18 prevents the actuator from being moved outside of the brake pedal stroke range, and also detects a zero brake pedal stroke when brake control is finished, allowing the system to switch to throttle control.

The limiter 18 helps define the range in which simply the braking effect of the engine is sufficient to maintain the desired driving pattern or whether an application of a brake control is necessary to shift to the next control pattern of the vehicle. This refinement helps to improve the accuracy of the automatic driving response to the desired driving pattern.

A change-over switch 21 can only be switched on in those cases when an acceleration or nominal velocity is less than a predetermined value as determined by an acceleration judging device 20 from the differentiator circuit 19. The switch prevents any abnormality of simultaneously opening the throttle while providing a braking force.

In operation, a drive pattern generator, not shown, can provide a nominal velocity $V_{NOM}$. This information can be delivered to the differentiator circuit 10 and an acceleration value $DV_{NOM}/DT$ at that time is then output from the differentiator circuit 10. This value of acceleration DVNOM/DT can then be placed into the estimated brake pedal force value generator circuit 16 in order to calculate an estimated brake pedal force value Fo on the basis of acceleration-brake pedal force characteristics that have been previously stored in the estimated brake pedal force value generator 16. The estimated brake pedal force value Fo is then delivered to the butt point 22 and applied to the brake pedal force opening converter 17 to determine the degree of opening required in order to obtain the predetermined brake pedal force. As mentioned previously, these values can be subjectively stored in order to determine $\Theta NOM'$. This value is then applied to the limiter circuit 18 and then, if the switch 21 is controlled, is applied directly to the brake servo system 14 to control the actual brake member 15.

The actual velocity VACT of the vehicle on the chassis dynamometer is monitored and is fed back to create a difference between the actual velocity VACT and the nominal velocity VNOM. The multiplier circuit 4 provides a proportional control. As a result, a proportioned control output is then added at the butt point 22 to the estimated brake pedal force value Fo and the result of this addition is again applied to the brake pedal force stroke converter circuit 17 to obtain a new estimated brake stroke nominal value $\Theta NOM'$. This brake stroke nominal value $\Theta NOM'$ is sent to the brake servo system 14 through the limiter circuit 18 when the change-over switch 21 is closed.

Figure 4:
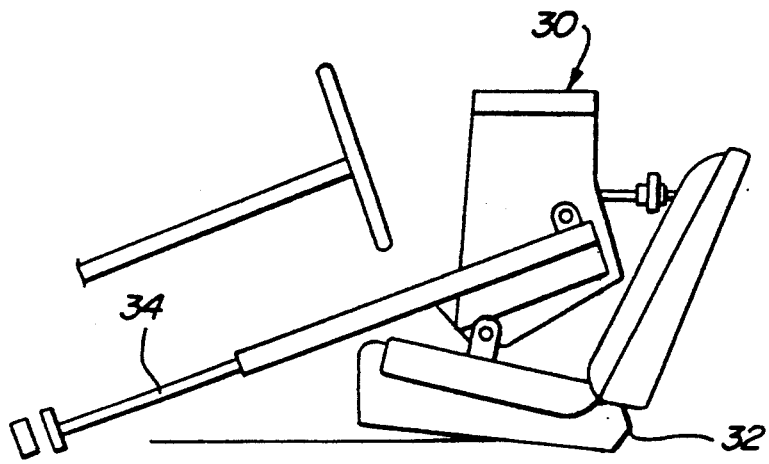
FIG. 4 is a side view of an automatic driving apparatus.
Figure 5:
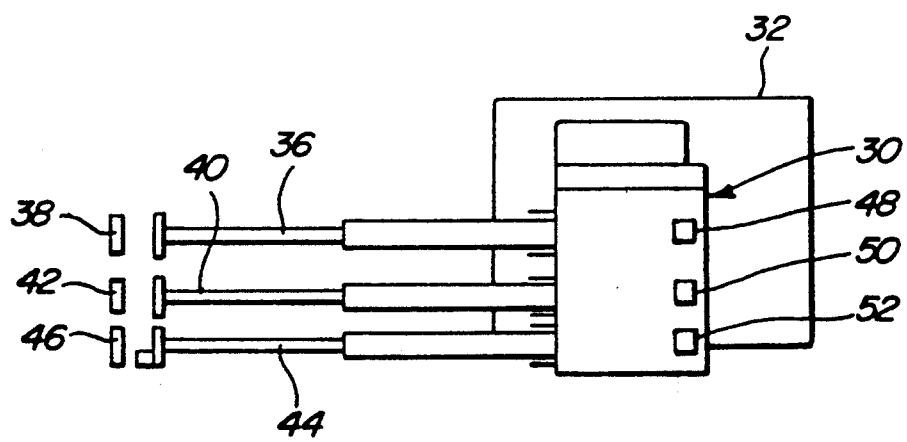
FIG. 5 is top view of an automatic driving apparatus.

Referring to FIG. 4, a schematic of a robot control apparatus for automatically operating driver controls is disclosed. The robot control device 30 can be mounted on the driver seat 32 and restrained by conventional means. Extending from the control device 30 is a series of actuators, for example, of a hydraulically or electrically driven configuration, that can be collectively referred to as actuators 34. As can be seen in FIG. 5, is a top view of the robotic control apparatus for automatically operating drive controls as disclosed.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for controlling an automatic driving of a vehicle, having driven control members, including a throttle for operation by a driver of the vehicle, for monitoring its performing comprising:
   operating means for automatically operating the driver control members, including a robotic control device for mounting in the vehicle in place of a human driver having actuators interconnecting the robotic control device with the driver control members;
   means for storing a relationship between acceleration and throttle open positions at various speeds of the particular vehicle being monitored;
   means for determining an estimated open position for the throttle required for accelerating at a nominal velocity;
   means for supplying the estimated throttle open position to the operating means;
   means for monitoring the actual velocity;
   means for automatically calculating the difference between the actual velocity and the nominal velocity, and
   means for responding to a calculated difference to adjust the control of the operating means.

2. The invention of claim 1 wherein the means for determining an estimated open position for the throttle includes a differentiator circuit.

3. The invention of claim 1 further including limiting means for providing a range of a throttle-open position.

4. The invention of claim 3 wherein the means for automatically calculating includes an integrator circuit which is inhibited from operating, if the range of the limiting means is exceeded.

5. The invention of claim 3 further including means for storing a relationship between an acceleration and a brake pedal force at respective different speed Positions of an vehicle;
   means for determining an estimated brake pedal force for the brake pedal at predetermined speed changing positions depending on an acceleration at a normal velocity, and
   means for supplying the estimated brake pedal force to the operating means.

6. The invention of claim 5 wherein, if the lower range of the limiting means is activated, an estimated brake pedal force is applied to the operating means.

7. A system for controlling an automatic driving of a vehicle, having driven control members, including a brake pedal for operation by a driver of the vehicle, for monitoring its performance comprising:
   operating means for automatically operating the driver control members, including a robotic control device for mounting in the vehicle in place of a human driver having activators interconnecting the robotic control device with the driver control members;
   means for storing a relationship between an acceleration and a brake pedal force at respective different speed positions of the vehicle;
   means for determining an estimated brake pedal force for the brake pedal at predetermined speed changing position depending on an acceleration at a normal velocity;
   means for supplying the estimated brake pedal force to the operating means;
   means for automatically calculating the difference between the actual velocity and the nominal velocity, and
   means for responding to a calculated differences to adjust the control of the operating means.

8. The invention of claim 7 further including limiting means to set a range of brake positions.

9. The invention of claim 7 further including a switch member that can block the application of a brake pedal force.

10. The invention of claim 9 further including means for monitoring the acceleration to control the position of the switch member from on to off.

11. A method for controlling an automatic driving of a vehicle, having driven control members for operation by a driver of the vehicle, for monitoring its performance in responding to a predetermined driving pattern, having robotic operating controls, comprising the steps of;
    installing a robotic control device in the vehicle having activators connected with the drive control members of the vehicle;
    automatically operating the driver control members with the robotic control device;
    storing a relationship between acceleration and throttle-open positions at various speeds of the particular vehicle being monitored;
    determining an estimated open position for the throttle required for accelerating at a nominal velocity;
    supplying the estimated throttle-open position to the operating means;
    monitoring the actual velocity;
    automatically calculating the difference between the actual velocity and the nominal velocity, and
    responding to a calculated difference to adjust the control of the robotic operating controls.

12. A method for controlling an automatic driving of a vehicle, having driver control members for operation by a driver of the vehicle, including an accelerator and brake pedal, for monitoring its performance in responding to a predetermined driving pattern, having robotic operating controls, comprising the steps of:
    installing the robotic operating controls in the vehicle having activators connected with the driver control members;
    storing a relationship between an acceleration and a brake pedal force at respective different speed positions of a vehicle;
    determining an estimated brake pedal force for the brake pedal at predetermined speed changing position depending on an acceleration at a normal velocity;
    supplying the estimated brake pedal force to the operating means;
    automatically calculating the difference between the actual velocity and the nominal velocity, and
    responding to a calculated differences by adjusting the control of the robotic operating controls.

* * * * *